E. I. Kline,
Bee Hive.
No. 77,892. Patented May 12, 1868.
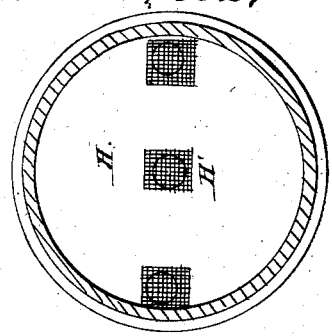
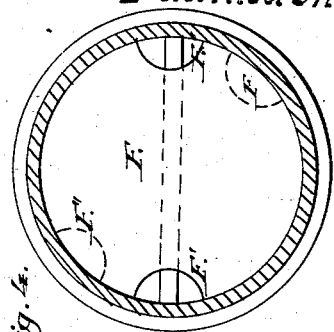
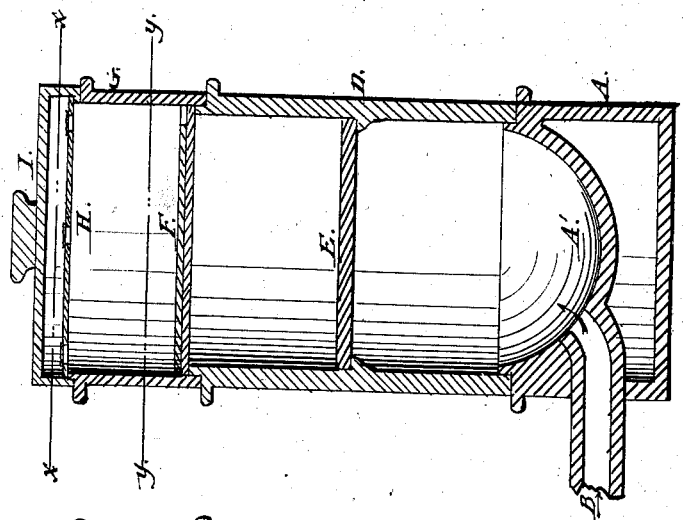
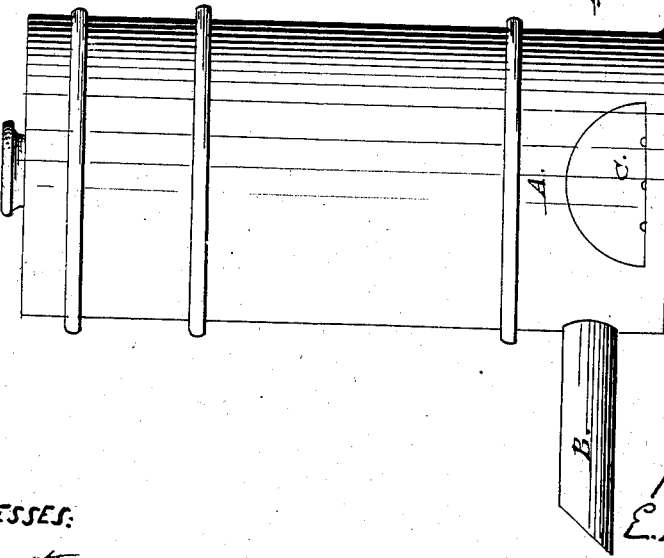
WITNESSES:
S. Ainarth
Chas. F. Clausen
INVENTOR
E. I. Kline
per Hollersay & Co.
Attorneys.

United States Patent Office.

E. I. KLINE, OF KIRKVILLE, IOWA.

Letters Patent No. 77,892, dated May 12, 1868.

IMPROVEMENT IN BEE-HIVES.

*The Schedule referred to in these Letters Patent and making part of the same.*

TO ALL WHOM IT MAY CONCERN:

Be it known that I, E. I. KLINE, of Kirkville, in the county of Wapello, and State of Iowa, have invented a new and useful Improvement in Bee-Hives; and I do hereby declare that the following is a full, clear, and exact description of the same, reference being had to the annexed drawings, in which—

Figure 1 is a side elevation.

Figure 2 is a vertical section.

Figure 3 is a horizontal section on the line $y\,y$, fig. 2; and

Figure 4 is a horizontal section on the line $x\,x$, fig. 2.

The same letters in all the figures are used to designate the same parts.

The body of the hive is formed of earthenware, baked and glazed like a crock. A is the base, into which the bees enter through the spout B. Openings are formed at C, through which moth may enter a chamber formed by the diaphragm A', in the lower part of the base. D is the main chamber of the hive, which rests on the base, A. Slats are placed across, as shown at E, to which the comb may be attached. The chamber D is covered by two glass plates, F, resting one on the other. They are cut away on the edges, as at F', to leave openings for the bees to pass from the chamber D into the cap G. By turning the upper plate, as shown in fig. 4, the passage from D to G is prevented. G is the section in which the surplus honey intended for use will be formed. This cap is covered by a glass plate, H, which should be formed with holes, H', for ventilation, such holes being protected by wire gauze, as shown in fig. 3. The cover I fits on the top of the cap. This construction renders all parts of the hive accessible.

What I claim as my invention, and desire to secure by Letters Patent, is—

A bee-hive, combining in its construction the following elements, viz: First, a base, A, constructed with a diaphragm, A', spout B, and openings C; second, a section, D, with slats at E; third, the double glass plates F; fourth, the section G; fifth, the glass plate H; and, sixth, a cap, I; said base, sections, and cap being composed of glazed earthenware, and the parts being arranged substantially as described.

In testimony whereof, I have signed my name to this specification in the presence of two subscribing witnesses.

E. I. KLINE.

Witnesses:
   GEORGE HARSIN,
   JAS. STEPHENSON.